Fig. 1

INVENTOR.
ARTHUR E. VOGEL

BY Schmieding and Fultz

ATTORNEYS

Fig. 2

INVENTOR.
ARTHUR E. VOGEL
BY
Schmieding and Fultz
ATTORNEYS

United States Patent Office 2,903,271
Patented Sept. 8, 1959

2,903,271

HYDRAULIC ANTI-TILTING APPARATUS FOR CONTROLLING VEHICLE SUSPENSION

Arthur E. Vogel, Columbus, Ohio, assignor, by direct and mesne assignments, of one-half to Dawson-Vogel Engineering Co., a partnership, one-fourth to Warren H. F. Schmieding, and one-fourth to Palmer Fultz, all of Columbus, Ohio Application June 30, 1955, Serial No. 519,078

25 Claims. (Cl. 280—112)

This invention relates to suspension systems for vehicles and more particularly to an apparatus for improving the cornering characteristics of a vehicle in negotiating a curve.

The conventional motor vehicle is ordinarily provided with springs between the body and the wheels of the vehicles so that such springs will absorb shocks and jars of the vehicle to provide safer and more comfortable riding for the occupants.

When the vehicle is rounding curves, however, the springs at the wheels on the side of the vehicle nearest to the center of the curve push upward on such side of the vehicle due to the fact that energy is stored in such springs by the normal weight of the vehicle. Such upward spring force helps to disturb the stability of actually upset the vehicle when rounding a curve by augmenting the centrifugal force that is concurrently exerted on the vehicle due to the fact that the vehicle is undergoing a change in direction.

The present invention constitutes an improvement in apparatus of the type disclosed in my co-pending application Serial Number 332,651 filed January 22, 1953, now abandoned, which type of apparatus eliminates a force detrimental to the cornering characteristics of a vehicle by decreasing the effect of stored spring energy on the side of the vehicle body nearest to the center of the curve being negotiated. Other advantages of this type of apparatus are set forth in detail in the above mentioned application.

It is therefore an object of the present invention to provide an improved apparatus of the above described type that utilizes non-compressible hydraulic fluid to provide compactness of size and hence adaptability to present vehicle suspension systems, yet which is flexibly indestructible, when actuated, to provide the desired spring energy confinement, under all adverse road surface conditions. Moreover, the apparatus of the present invention provides a high degree of riding comfort, when actuated to effect spring energy confinement, even when rough road surface conditions are encountered in rounding a curve.

It is another object of the present invention to provide a novel controlled suspension system for vehicles which provides the ultimate in smooth riding characteristics, in a novel manner, by incorporating suspension springs having the characteristics of unprecedented spring travel, between limits of compression and expansion, combined with unprecedented low rate of spring force change per unit length of spring compression or expansion. In combination with the above spring characteristics, the present novel suspension system includes control means for automatically preventing the release of energy confined in said spring type when the vehicle is negotiating a curve, said spring type, although providing the ultimate in smooth riding conditions, being extremely dangerous, when the vehicle is cornering, unless utilized in combination with said control means, whereby, for the first time both safety and the ultimate in riding comfort are incorporated in the same suspension system.

It is another object of the present invention to provide a novel controlled hydraulic suspension system for vehicles, which system includes fluid pressure limiting means adapted to confine energy stored in the vehicle springs when the vehicle is negotiating a curve, said pressure limiting means being adapted to effect unyielding confinement, up to a predetermined fluid pressure value for the particular vehicle type, yet yieldable above said fluid pressure value when rough road conditions are encountered. As a result, the use of a compact low pressure hydraulic system becomes possible since, when provided with the fluid pressure limiting means of the present invention, such system is indestructible notwithstanding the most severe impacts that may be imposed on the suspension system by such rough road conditions. Moreover, improved characteristics of ride are achieved since the confined suspension system yields from and returns to its confined configuration whereby the unsprung weight of the vehicle can follow uneven road surface conditions without transmitting the effects thereof to the sprung weight and passengers.

It is still another object of the present invention to provide a novel controlled suspension system adapted to permit the elimination of separate shock absorber units, and which safely allows the elimination of what is commonly termed an anti-roll or transverse torsion bar, conventionally interconnected between the two sides of the front suspension system of a vehicle. By eliminating the latter not only can complete independence of the two front wheel suspensions be safely achieved, but the adverse effect, encountered when a conventional anti-roll bar unloads stored energy in the latter half of an S-curve, is completely eliminated.

Other objects and advantages of the present invention will be apparent from the following description, reference being had to the accompanying drawings wherein preferred forms of embodiments of the invention are clearly shown.

Figure 1:
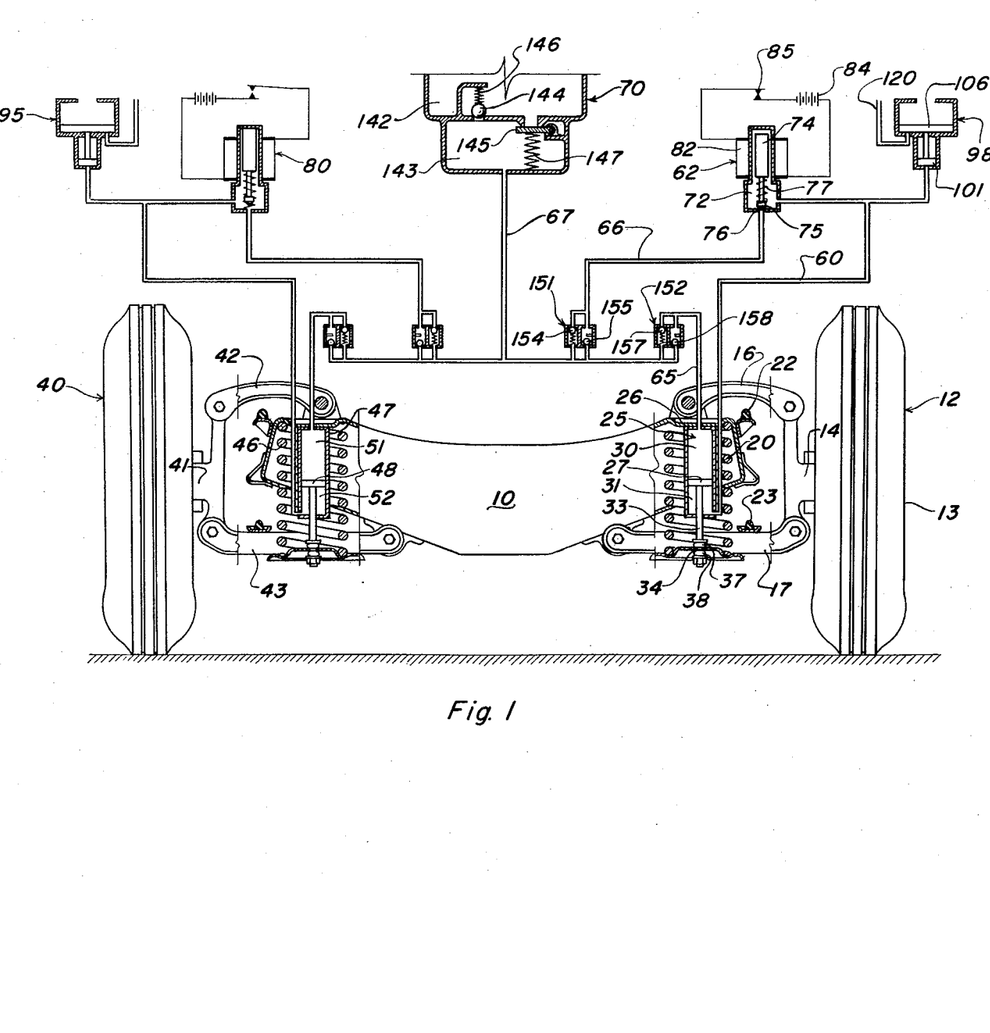
Figure 1 is a diagrammatic view showing an apparatus constructed according to the present invention and applied to a typical suspension system of a motor vehicle.

Referring next to Figure 1 of the drawing, a frame, or sprung weight, of a typical motor vehicle is indicated generally at 10. Figure 1 is a view, partially diagrammatic, of the apparatus of the present invention, with the wheels and suspension system appearing essentially as seen from the front of the vehicle.

A left front wheel and control arm assembly, indicated generally at 12, constitute a portion of the unsprung weight of the vehicle, with such assembly including wheel 13, axle 14, and an upper and lower control arm, indicated at 16 and 17 respectively. A left front spring 20 is interposed between the sprung weight 10 and the unsprung weight 12, and resilient bumpers 22 and 23 provide cushioning effects at the upper and lower limits of relative movement between the sprung and unsprung weight.

A hydraulic confining cylinder 25 is provided with its upper end secured to frame 10 at 26, with such cylinder being fitted with a piston 27 which isolates an upper chamber 30 from a lower chamber 31. Piston 27 is mounted on a rod 33 connected to the lower control arm assembly at 34 such that relative movement, between the frame 10 and the unsprung weight assembly 12 causes piston 27 to reciprocate in cylinder 25. The rubber elements 37 and 38 provide a cushioned flexible connection between rod 33 and control arm assembly 34.

With continued reference to Figure 1, a right front wheel and control arm assembly is indicated generally at 40, which assembly includes an axle 41 and an upper and lower control arm designated 42 and 43, respectively.

The right front side of the vehicle includes additional elements corresponding to those described for the left front side, and, for purposes of describing the present invention, the important elements consist of a right spring 46, a hydraulic confining cylinder 47, provided with a piston 48 which divides the cylinder into an upper chamber 51 isolated from a lower chamber 52.

As seen in Figure 1, a line 60 connects the lower chamber 31, of hydraulic cylinder 25, with a valve means indicated generally at 62, and with a pressure limiting means indicated generally at 98. The upper chamber 30, of hydraulic cylinder 25, is connected to the valve means 62 by lines 65 and 66. A line 67 connects a reservoir means, indicated generally at 70, with line 65 which leads to the upper chamber 30 of cylinder 25, and with line 66 leading to valve means 62.

With particular reference to valve means 62, such valve means includes a chamber 72 to which both lines 60 and 66 are connected. Chamber 72 encloses a moveable valve member 74 provided with a tapered end 75 adapted to form an absolute seal with a seat 76. A coil spring 77 normally maintains valve member 74 in an upper unseated position. Such unseated valve position is illustrated at the right valve means 80. A solenoid 82 surrounds the housing of valve means 62 and encircles the upper portion of moveable valve member 74, which upper portion forms a core for the solenoid. The solenoid 82 is selectively connected and disconnected to a source 84 of electrical energy by means of a suitable control and switch mechanism schematically illustrated at 85.

To actuate the valve means, to the seated position illustrated at valve means 62, switch 85 is closed to energize solenoid 82 which effects movement of lower end portion 75 of valve member 74 into seated engagement with seat 76.

It should be noted that when the valve means 62 is in the seated position illustrated, the passage of fluid from line 60 to line 66 is prevented and, any build up of pressure in line 60 will augment the action of solenoid 62 due to the pressure increase in chamber 72 effective on the upper surface of end portion 75 of moveable valve member 74. Hence, when the valve means is closed as illustrated at 62, fluid cannot pass from the lower chamber 31, of cylinder 25, past the valve means 62 and through lines 66 and 65 to the upper chamber 30, nor can it pass through lines 66 and 67 to reservoir 70. It will therefore be understood that, with the valve means actuated as shown at 62, a confining force will be imposed upon the left vehicle spring 20 to resist the unloading of spring energy stored in said spring.

Reference is next made to pressure limiting means 98 which may be in the form of a preloaded force applying means of the type illustrated in Figure 2 and later to be described, or it can be provided by other suitable means, all falling within the spirit of the present invention.

Pressure limiting means 98 provides resiliency for the non-compressible hydraulic fluid connection, formed by line 60, between the lower chamber 31 of cylinder 25 and the chamber 72 of valve means 62. The pre-loaded force applying means 98 is provided with a predetermined preloaded force yieldable at a desired predetermined pressure value for the system.

In accordance with the present invention it has been discovered that a relatively small confining force is required, in actual operation, to confine the energy stored in spring 20, and, correspondingly, a relatively low maximum pressure value need be tolerated in the hydraulic system in order to completely effect the desired results of the present invention. At this point it should be pointed out that it is important to completely prevent expansion of spring 20, from its confined configuration, to prevent such spring from unloading any of its energy under the severest centrifugal forces encountered in cornering. At the same time, it has been determined that the hydraulic connection, provided by line 60 between chamber 31 and valve means 62, must be rendered yieldable, as contrasted to an absolute hydraulic lock, at some fluid pressure greater than the above mentioned fluid pressure required to effect complete confinement of the spring energy stored at spring 20 under the most severe centrifugal forces encountered in cornering.

It has also been discovered that the lower the predetermined maximum pressure value, at which the pressure limiting means yields, the better are the riding qualities of the vehicle, since the better is the ability of the unsprung weight portion 12 to follow variations in the road surface when the vehicle is cornering with the apparatus actuated.

In accordance with the present invention, it has been discovered that in the case of conventional passenger motor vehicles, and where the cylinder 25 is located at the vertical longitudinal axis of the spring means 20, only a relatively small maximum confining force of approximately 500 pounds at such cylinder location, and hence only a relatively low maximum hydraulic pressure, are required to completely prevent departure of spring 20, from confinement at normal configuration, under the severest centrifugal forces encountered. Such relatively low hydraulic pressure is 500 pounds per square inch if the effective area of the under side of piston 27 is one square inch. It will be understood that with such relatively small maximum force and pressure being applied, the unsprung weight will of course readily depart up and down, from a normal confined position, responsive to encounterment of bumps and depressions in the road. After an even road surface condition has been negotiated, however, the suspension system will be returned to and confined at a position of confinement. Such return to confinement will be effected by the action of vehicle spring 20 as such spring seeks equilibrium, and by the action of the preloaded force applying means 98. The latter return action occurs after fluid has been forced into the pressure limiting means, and after the rough road condition has ceased to exist, then the action of the preloaded force applying means 98 will return the fluid through the line 60 and back into the lower chamber 31 of the cylinder 25. This forces piston 27 upwardly and back to a position of spring confinement.

Only a relatively small maximum force and pressure is required to maintain and return the suspension system to the normal configuration present at the time of curve entry, due to the fact that valve means 62 is instantly closed, by suitable control means, just prior to or as the vehicle enters the curve. Due to such early valve actuation, spring 20 and the sprung weight 10 are confined before the energy stored in the spring commences upward movement of the frame and body; this confinement prevents initiation of the capable relatively great inertia presented by such sprung members. As previously stated, it has been determined, that, with conventional passenger vehicles, a relatively low maximum pressure of approximately 500 pounds per square inch is required to completely effect the purpose of the present invention provided actuation of the apparatus is effected prior to or at the entry of the vehicle in the corner to be negotiated.

Figure 2:
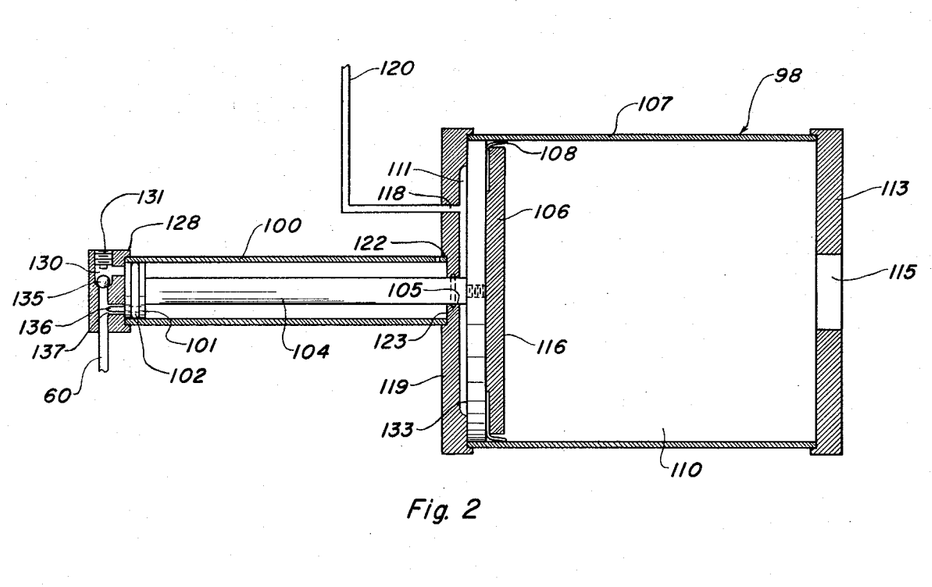
Figure 2 is a side elevational view, partially in section, of a hydraulic pressure limiting means constructed according to the present invention.

Referring next to Figure 2, a pressure limiting means constructed according to the present invention is illustrated in a detailed section, with the section being taken along a vertical plane passing through the centerline of such apparatus. Pressure limiting means 98 includes a fluid intake cylinder 100 which slidably carries a piston 101 adapted for reciprocating movement within the cylinder. Piston 101 is provided with a fluid seal 102 and is mounted on the end of a rod 104. The other end of rod 104 carries a larger pneumatic piston 106, said latter piston being adapted for reciprocating movement in a cylinder 107. A resilient seal 108 prevents air from leaking from a chamber 110 past piston 106 to a vacuum chamber 111. Cylinder 107 includes an end plate 113 provided with a hole 115 whereby chamber 110 is maintained open to the atmosphere. Hence surface 116 of piston 106 is continuously subjected to atmospheric pressure. A hole 118 is formed through the other end plate 119 and a vacuum line 120 connects vacuum chamber 111 with a suitable source of vacuum, not illustrated, such as the intake manifold of the vehicle.

It should be noted that hydraulic cylinder 100 is firmly secured to pneumatic cylinder 107 at a junction 122, and a resilient seal 123 is located between end plate 119 and rod 104 to provide a seal between vacuum chamber 111 at inner surface 105 of the hole centrally located in end plate 119 for receiving the rod 104.

Referring again to fluid intake cylinder 100 such cylinder is provided with an end closure block 128 having an inner chamber 130 connected with the previously mentioned hydraulic line 60. Such line, illustrated in Figure 1, leads to chamber 72 for the valve means, and to lower chamber 31 of hydraulic confining cylinder 25. A removable plug 131 provides a means for bleeding air from chamber 130 after the system is first filled with hydraulic fluid.

It will be understood that with vacuum line 120 being connected to a source of vacuum, the atmospheric pressure on side 116 of piston 106 is greater than the pressure exerted on the vacuum side 133 of such piston. Accordingly, such differential in pressure produces a definite preloaded force which constantly urges piston 106 towards the position illustrated, and, consequently, constantly urges hydraulic piston 101 toward its corresponding illustrated position. It will be understood that a precise desired predetermined force, previously described herein, can accurately be provided by selecting the appropriate area for the pneumatic piston 106, since the vacuum pressure in chamber 111 can be readily determined, and since the atmospheric pressure exerted on the other side of piston 106 is a substantially constant and known value.

With continued reference to Figure 2, a suitable cushioning means is provided for cushioning the return stroke of hydraulic piston 101, after yielding of such piston responsive to the intake of fluid in chamber 130 when road shocks are encountered. Such cushioning means may be provided by a ball check valve 135, adapted to seat in the enclosure block 128, and a tapered pin 136 adapted to enter a hole 137, in block 128. When entry of tapered pin 136 into the hole 137 occurs prior to the complete return of piston 101 to the position illustrated, the point of tapered pin 136 enters hole 137 and progressively throttles the fluid return rate since fluid can return only through hole 137 due to ball check valve 135. As a result, the arresting of piston 101, rod 104 and piston 106 will be cushioned rather than being abrupt, as would be the case if the cushioning means described were not provided.

Figure 3:
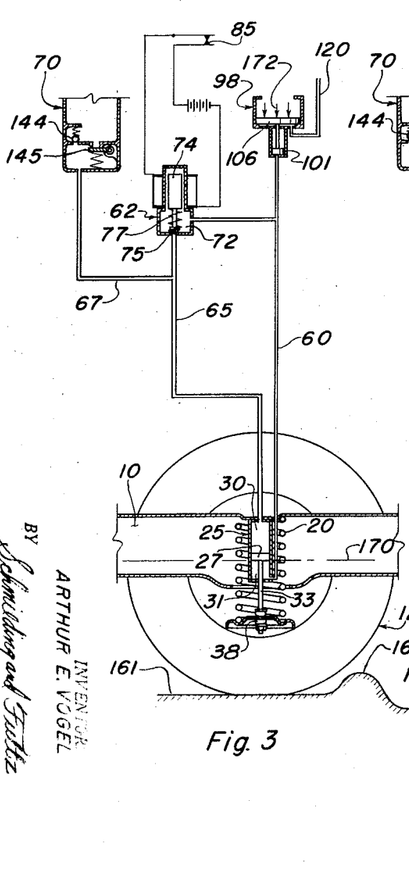
Figure 3 is a diagrammatic view provided to illustrate the operation of an apparatus constructed according to the present invention when such apparatus is actuated and the vehicle is negotiating a curve.
Figures 4, 5:
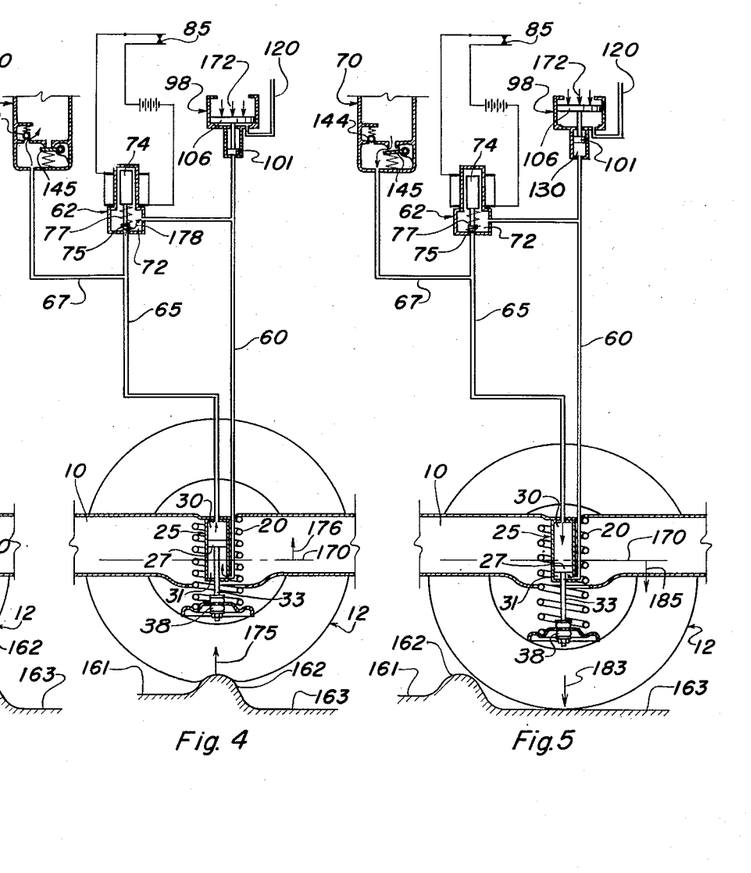
Figure 4 is a view corresponding to Figure 3 and showing operation of said apparatus when the vehicle wheel, at which spring energy is being confined, encounters rough road conditions in said curve.
Figure 5 is a view corresponding to Figures 3 and 4 which view shows additional operational functions of the apparatus when the vehicle wheel is encountering said rough road conditions.

By referring to Figures 1 and 5 of the drawing, it will be understood that after yielding of the pressure limiting means, the piston 27 in Figure 5 and the piston 101 in Figure 2, are returning at the same time the configuration of the sprung weight relative to the unsprung weight of the vehicle is returned to a confined configuration as illustrated in Figures 1 and 3. That is, as the suspension system of the vehicle returns to confinement, after a rough road condition is encountered, pressure limiting means 98 will expel liquid back into chamber 31 of the confining cylinder, and the vehicle will continue in the corner with the vehicle spring of the suspension system confined against stored energy release.

Referring again to the cushioning means provided by the check valve 135 and tapered pin 136, in Figure 2, it will now be understood that as the suspension, after yielding, returns to or through the confinement position, a certain roughness of ride would be encountered were the cushioning means 135 and 136 not provided in the system. Due to the presence of these cushioning means, the previously described preloaded force, and its pressure effect on the hydraulic system, are removed at a cushioned rate rather than with a sudden instantaneous effect.

Referring again to Figure 1, reservoir 70 includes a main chamber 142 and a lower chamber portion 143 separated by a fluid actuated preloaded ball check valve 144, openable in one direction, and a second fluid actuated check valve 145 openable in the other direction. The ball check valve 144 is maintained normally closed by a preloaded force applied by a spring 146.

It should at this point be pointed out that reservoir 70 is required since when piston 27 reciprocates in confining cylinder 25, the volume of rod 33 will be, during operation, continuously added to and subtracted from the volume of lower chamber 31.

When the unsprung weight of the vehicle is moving upwardly relative to the sprung weight, the volume of rod 33 is being added to chamber 31. Fluid is driven through line 66 and 60 and down into the lower chamber 31, but since more fluid is being exhausted from upper chamber 30 than can be taken into lower chamber 31, due to the volume of the rod being added, the reservoir 70 is provided to take in the excess fluid, over that which can be received by lower chamber 31. When the unsprung weight is moving downwardly, relative to the sprung weight, fluid must be given up from reservoir 70 through the line 67 into the left circuit in order to keep the system full. This is true because upper chamber 30 requires more fluid intake than is supplied by the volume of fluid being exhausted from the lower chamber 31 due to the presence of rod 33 therein.

In view of the above described volume differential, it will be understood that the preloaded fluid actuated ball check valve 144 and the fluid actuated check valve 145 serve as anticavitation means for the following reasons. When the piston 27 is moving downwardly, relative to confining cylinder 25, the system demands fluid from reservoir 70 for the above described reasons, and, accordingly, check valve 145 will very easily overcome the light acting spring 147, which spring is merely provided to position valve 145, and the required amount of fluid is rapidly dumped into the left hydraulic circuit to supply the demand for same at upper chamber 30 as needed. When the suspension system is moving in the other direction, that is, when piston 27 is moving upwardly in confining cylinder 25, fluid pressure will maintain check valve 145 closed and spring 146 will yield and allow ball check valve 144 to open, as required, whereby the excess fluid passes into reservoir 142. The preloaded pressure at ball check valve 144 is sufficient that fluid will travel around the circuit, through lines 66, 60, and into lower chamber 31 of the confining cylinder 25, more readily than it can open check valve 144 and go to the reservoir. Hence fluid will be forced from upper chamber 30 around the circuit into lower chamber 31 whereby such chamber is maintained full, with the amount of fluid exhausted into the reservoir being equal to the amount of excess which lower chamber 31 cannot handle due to the addition of rod 33. It will be understood that the pressure required to overcome the preload at ball check valve 144 need not be great because the function of such valve is merely to force fluid against the resistance of the circuit and valve means 62 and into the lower cylinder 31. It has been found that preloading ball check valve 144 to open at approximately 75 pounds pressure is completely adequate for the purpose.

In view of the above, it will be understood that due to the presence of such anti-cavitation means, provided by ball check valve 144 and check valve 145, both upper chamber 30 and lower chamber 31 of confining cylinder 25 are maintained full of fluid under all road conditions. This condition is necessary to eliminate rough shocks and noise which would be caused by hydraulic hammering and to continuously provide the presence of fluid in all portions of the circuit in order that the components thereof are completely operative at all times.

Referring again to Figure 1, and to the hydraulic circuit for the left wheel, suitable shock absorbing means may be readily provided in the circuit, with two of such means being indicated generally at 151 and 152. Shock absorbing units, of the particular type illustrated, can be completely external of the confining cylinder 25, as well as located away from the crowded conditions at the suspension system. For example, the units can be mounted up under the hood of the vehicle adjacent the reservoir, valve means and pressure limiting means.

With reference to shock absorbing means 151, this unit is operative when unsprung weight of the vehicle is moving downwardly with respect to the sprung weight. When this occurs, a preloaded valve means 154 provides resistance to the passage of the fluid from the lower chamber 31 to the reservoir 70. It will be noted that unit 151 presents unidirectional resistance since, when the unsprung weight is moving upwardly, a floating ball check valve means 155 opens freely to permit the passage of fluid from upper chamber 30, around the circuit, and into lower chamber 31.

Referring next to shock absorbing means 152, such unit also presents unidirectional resistance to the flow of fluid and provides shock absorber action when the unsprung weight is moving upwardly relative to the sprung weight. In such instance, a preloaded ball check valve 157 presents resistance to the flow of fluid out of upper chamber 30 when such fluid is being discharged to reservoir 70 and lower chamber 31. When the unsprung weight is moving downwardly, however, a freely floating ball check valve 158 is opened freely by the action of flowing fluid whereby fluid readily enters upper chamber 30 as is required to keep such chamber full as piston 27 moves downwardly with the unsprung weight.

In view of the above description it will be understood that the two shock absorbing units 151 and 152, each of which presents unidirectional resistance to fluid flow, and opposite unidirectional freedom of fluid flow can be included, as shown, to replace conventional separate shock absorber units on a motor vehicle, or the two shock absorbing means 151 and 152 can be completely eliminated from the circuit of the present invention in instances where shock absorber means are either already present or not required. When shock absorbing units 151 and 152 are eliminated from the circuit of Figure 1, as shown in Figures 3, 4, 5, the previously described functioning of the apparatus, in effecting the desired spring energy confinement, will be accomplished with full effect and provide the advantages of the present invention in the manner described.

Reference is next made to Figures 3, 4, and 5 which are provided for the purpose of illustrating the dynamic functioning of the present apparatus when rough road conditions are encountered in a curve. It will be noted that each of the Figures 3, 4, and 5 depict the same vehicle, including sprung weight portion 10 and unsprung weight portion 12, encountering the same rough road conditions. Such condition includes a level road surface portion 161 followed by a protruding bump 162, which is in turn followed by a depressed road surface portion 163 as would be caused by a hole in the road surface. In each of the Figures 3, 4, and 5 the vehicle is negotiating a curve, with the apparatus of the present invention actuated, and the unsprung weight 12 and spring 20, illustrated in each of these Figures 3, 4, and 5, represent the front unsprung weight and spring at the side of the vehicle nearest the center of the curve being rounded. Hence spring 20 is the spring at which stored spring energy must be confined in order to effect the results of the present invention.

With reference to Figure 3, the first of the sequence of views showing the dynamic operation of the apparatus, it will be noted that the switch means, schematically illustrated at 85, is in the closed position whereby valve means 62 is in the closed position. Accordingly, the valve prevents the passage of fluid from the lower chamber 31 of confining cylinder 25 out through line 60 and isolates chamber 31 from reservoir 70 whereby confining cylinder 25 and piston 27 are hydraulically latched at a normal configuration datum line indicated at 170 on the drawing. Hence, even though spring 20 has the capacity to expand due to its confined energy, and would ordinarily do so under the augmenting action of centrifugal force acting on the vehicle body, the hydraulically latched confining cylinder 25 and piston 27 restrain such unloading of energy and completely eliminate any departure of the suspension system from the normal configuration datum 170 up to the point that a fluid pressure is developed, in lower chamber 31 and line 60, of sufficient magnitude to produce yielding of the pressure limiting means 98 against the preloaded force provided by atmospheric pressure at 172. As previously described, pressure limiting means 98 will never yield responsive to pressure values imposed by inertia forces alone since the preloaded force at 172 is predetermined to resist the maximum pressure that will be developed, for the particular vehicle weight and configuration, in negotiating the severest curves to be encountered.

It will be noted, from Figure 3, that both preloaded ball check valve 144 and fluid dump check valve 145 are closed since no fluid is moving in the circuit, and hence reservoir 70 is not being called upon to take in or give up fluid to the circuit.

When the unsprung weight 12 of the vehicle encounters a bump 162 as seen in Figure 4, it is driven more or less violently upward, depending on the magnitude of the bump, as indicated by arrow 175. At the same time, piston 27 will move upwardly as indicated by arrow 176, with the upward movement of piston 27 in confining cylinder 25 driving fluid upwardly through line 65. It will be noted that some of the fluid moving out of chamber 30 around the circuit through the valve means 62, will pass through line 60 and into the lower chamber 31. Since more fluid is being driven out of chamber 30 than can be taken into chamber 31, some of the fluid will necessarily leave line 65, pass through line 67, and force open the preloaded ball check valve 144 to allow such excess fluid, beyond that needed to keep chamber 31 full, to enter reservoir 70.

In referring to Figure 4, it should be noted that the system is still actuated, as represented by the closed condition at switch means 85, whereby solenoid action is still urging moveable valve member 74 downwardly towards its stationary seat. The fluid flow indicated at the arrow 178, however, exerts enough pressure on seat portion 75 of member 74 to force the valve open and allow fluid to pass from line 65, through line 60, and down into the lower chamber 31 of confining cylinder 25. As seen in Figure 4, piston 27 has moved upwardly relative to normal configuration datum 170 and fluid has been forced to pass into lower chamber 31 due to the presence of anti-cavitation action provided by the fluid actuated check valves 144 and 145 in the manner previously described.

At this point it should be pointed out that in the stage of negotiating a protrusion, illustrated in Figure 4, no high hydraulic pressures will be imposed upon the system and hence there will be no tendency to rupture the component parts thereof, even though valve means 62 is actuated and urged towards the closed position. This is true because valve means 62 is adapted to open in one direction responsive to fluid flow at 178 whereby fluid can flow around the circuit, even though the apparatus is in the actuated configuration. Hence no high fluid pressures can be imposed on the components of the hydraulic system when a protruding bump imposed high impact stresses on the suspension.

Referring next to Figure 5, the dynamic configurations of the various elements are illustrated as they appear after the unsprung weight 12 leaves the protruding bump 162. As the wheel of the vehicle leaves bump 162, the relatively high amount of stored spring energy of the vehicle spring 20 drives the unsprung weight 12 rapidly downwardly as indicated by arrow 183, and, accordingly, piston 27 moves downwardly in confining cylinder 25 as indicated by the arrow 185. At this point the highest impact stresses, to which a suspension system is subjected, occur, and consequently, were it not for pressure limiting means 98 of the present invention, the highest fluid pressure would be imposed on the components of the hydraulic circuit of the present apparatus. Indeed, it should be pointed out that were it not for the presence of the pressure limiting means 98, the impact stresses, and resulting hydraulic pressures, would be of such great magnitude as to make confining of the suspension system, by means of a noncompressible fluid, a practical impossibility due to limitation imposed by the strength of known materials. This fact has been conclusively demonstrated by the repeated failures of known prior experiments wherein attempts were made to confine a suspension system with a noncompressible hydraulic fluid, but without the use of the pressure limiting means of the present invention. In the instances of such prior failures, the components of the hydraulic circuit were progressively increased in size and strength up to the point at which actual destruction of the vehicle frame was experienced. In the course of making the present invention it was discovered by the present inventor that such prior failures were primarily caused by the specific dynamic condition illustrated in Figure 5, which condition, as stated above, imposes, the ultimate magnitude of impact stress and pressure to which the suspension system and hydraulic circuit are subjected.

With continued reference to Figure 5, as the unsprung weight 12 is driven downwardly by the combined action of its own static weight and the unloading of confined energy vehicle spring 20, the combined forces imposed by such spring and static weight are, of course, great enough to far exceed the preloaded limiting forces at 172. Hence fluid will be taken into chamber 130 of pressure limiting means 98 since valve means 62 presents an absolute block to fluid passage. Such yielding of pressure limiting means 98 permits the exhaust of fluid, from lower chamber 31, as piston 27 moves downwardly in following the downward movement of unsprung weight 12. At this point it is important to note that no fluid can flow past valve means 62 since seat member 75 is urged downwardly and provides an increasingly more positive complete seal due to the high fluid pressure exerted on the top of seat element 75 by the fluid in valve chamber 72. Hence, a constant volume of fluid is trapped in the circuit portion comprising fluid chamber 72 of the valve, line 60, and lower chamber 31 of the confining cylinder. It is important that the fluid volume in this circuit portion be retained in order that piston 27 will be forced back upwardly, to a position of spring confinement as is illustrated in Figure 3, after the vehicle has negotiated the depression 163 and the wheel has settled down on flat even road surface. Hence, as the vehicle continues in the curve, and the vehicle has negotiated the rough road conditions described, the configuration of the apparatus returns to a spring confining configuration, as illustrated in Figure 3, whereby the stored energy in spring 20 will continue to be confined by the apparatus. At the same time, the apparatus is maintained resiliently yieldable, as shown in Figures 4 and 5, when rough road conditions are being negotiated.

The above described resiliently yieldable characteristic of the system is extremely important, not only from the standpoint of preventing high fluid pressures which would cause failure of the components of the apparatus, but also to allow the unsprung weight 12 of the vehicle, including the wheel, to follow the bumps of the road independently of movement of the sprung weight of the vehicle frame and body. It will be understood that due to the high amount of inertia possessed by the sprung weight of the vehicle frame and body, such frame and body will substantially not depart from a normal ride level when bumps of short duration are encountered, but, at the same time the unsprung weight should be free to move up and down and negotiate such bumps, with a cushioned effect. It will hence be understood that were the pressure limiting means 98 not present in the system, the mass of the unsprung weight and piston 27 could not move downwardly, relative to the frame and body, because piston 27 would, in that instance, be confronted with an absolute hydraulic block since no fluid could pass closed valve means 62 or otherwise escape without pressure limiting means 98 being provided for taking in a portion of the constant volume of fluid maintained in the circuit portion comprising the valve chamber 72, line 60, and lower chamber 31 of confining cylinder 25.

Referring again to Figure 5, it will be noted that as piston 27 moves downwardly, fluid dump check valve 145 freely opens whereby reservoir 70 can readily add fluid to the circuit to supply the fluid required in upper chamber 30 to compensate for the fact that fluid is being exhausted from the lower chamber 31 to the pressure limiting means and not to the upper chamber 30.

At this point it will be understood that were the fluid dump valve 145 not readily openable whereby fluid could progress, without resistance, rapidly through lines 67, 65, and into upper chamber 30, then, in that instance, cavitation and resulting hydraulic shock and noise would occur in confining cylinder 25 when piston 27 strikes fluid in returning upwardly, from the position of Figure 5, to the normal configuration datum line 170. Such cavitation would occur because upper chamber 30 was not maintained completely full of hydraulic fluid. To prevent same, as piston 27 moves downwardly to the position of Figure 5, then at such time it is necessary that dump valve 145 opens rapidly, by fluid action, in order to add fluid to the circuit to keep upper chamber 30 full.

To prevent cavitation on the up stroke of piston 27 when bumps are encountered, and resulting shock and noise on the down stroke that follows, dump valve 145 must be closed during said up stroke and preloaded check valve 144 must be biased closed to maintain sufficient hydraulic pressure to cause fluid exhausted from upper chamber 30 to be driven around the circuit and into lower chamber 31 instead of only into reservoir 70.

It will be understood that with chamber 31 being maintained full of fluid, valve means 62 can accomplish its function of again confining spring 20 against the release of energy stored therein. Concurrently with the driving of fluid from upper chamber 30, around the circuit, and into lower chamber 31, when the suspension system is returning, from the configuration of Figure 5 to normal configuration or above, then preloaded check valve 144 is opened by fluid to permit the passage of excess fluid to reservoir 70.

Referring again to Figure 4, which shows a protruding bump being encountered, with the apparatus actuated and the vehicle in a curve. Fluid is driven upwardly through valve means 62, as indicated by the arrow 178, as the piston 27 moves upwardly. It will be understood that as soon as the direction of the fluid flow, at arrow 178, reverses, which occurs as the wheel starts downwardly, the valve member 75 will be driven downwardly against its seat, by fluid pressure, with the result that more fluid will be trapped in the circuit portion consisting of valve chamber 72, line 60, and lower chamber 31, than was previously present prior to the encountering of the bump. In other words, a hydraulic ratcheting action will occur due to the particular unidirectional yielding and sealing characteristics of the valve type. This ratcheting effect means that the vehicle spring 20 will be confined to an even greater extent, and the unsprung weight 12 will be retained closer to the sprung weight 10 after a bump has been encountered in a curve. Hence, with the present apparatus, the spring confining effect will actually increase and become more advantageous if and after bumps have been encountered in negotiating a curve. The above described ratcheting effect has been found, with the circuit of the present invention, to be completely self-releasable after the vehicle has completed a curve and is progressing in a straight path, since only the slightest irregularity in road surface is sufficient to crack the valve means 62 and release the ratchet effect. As the vehicle leaves the curve the switch means 85 will be opened whereby the solenoid of valve 62 is de-energized. As the vehicle leaves the curve, the seat member 75 of valve means 62 may be biased downwardly against its seat even though the switch 85 is open due to the fact that vehicle spring 20 had been confined shorter than its normal configuration by the above described ratcheting effect. When the vehicle establishes straight road equilibrium, with this abnormal confinement present on the spring, a pressure bias will be present on the circuit portion consisting of lower chamber 31, line 60, and valve chamber 72, and hence on the upper surface of seat member 75 such that the seat member 75 will be maintained seated even after the vehicle has completed the curve and switch 85 has opened. This condition, however, is not at all noticeable to the driver and will be immediately self-correcting since, when the least irregularity in road surface is encountered, the abnormal pressure bias, in the above described circuit portion, will release when a corresponding pressure occurs in line 65 and against the lower surface of seat element 75 whereby seat element 75 will be cracked from its seat position. Once the valve is cracked only the slightest amount, with the solenoid of valve 62 not being energized, valve return spring 77 serves its function of returning and retaining moveable valve member 74 to and in its normal upward unseated position. Hence, it is seen that the hydraulic ratcheting effect, which can occur in the condition of Figure 4 with the particular valve type illustrated, produces no noticeable effects on ride, and after the vehicle leaves the curve the condition quickly automatically releases itself to provide normal unconfined straight road operation.

Figure 6:
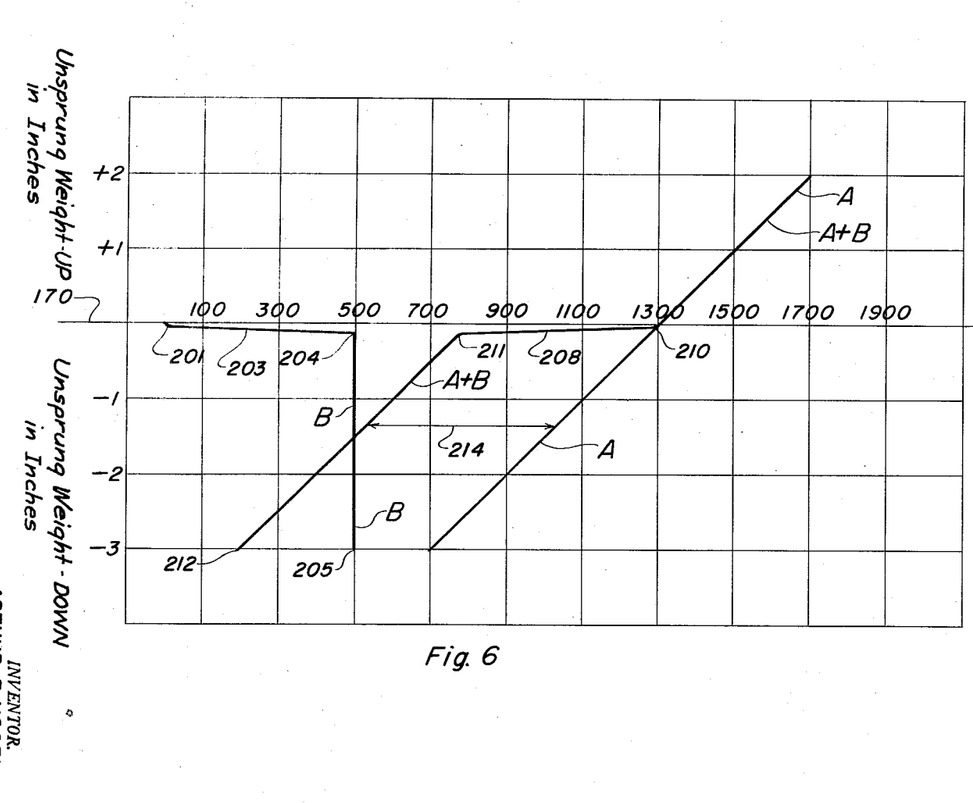
Figure 6 is a graph showing the magnitudes of forces exerted by a vehicle suspension spring, between the sprung and unsprung weight of a typical vehicle, for various displacements of the sprung weight above and below a normal static configuration. In addition, the graph illustrates modifications of effect, on the vehicle body, of such exerted forces, such modifications being provided by the apparatus of the present invention.

Reference is next made to Figure 6 which is provided to graphically illustrate the function of the present apparatus in yieldably confining spring energy stored in the vehicle spring 20. This graph should be considered in connection with the three preceding Figures 3, 4, and 5, which illustrate the dynamic operation of the present apparatus when rough road conditions are encountered in a curve.

Line A in Figure 6 shows the force effect produced, between the sprung and unsprung weight, by vehicle spring 20 for various displacement of the unsprung weight from the normal configuration datum line 170, and relative to the sprung weight portion of the vehicle, assuming that the position of the sprung weight portion of the vehicle remains unchanged, and that the unsprung weight moves up and down relative to same. For a typical vehicle, the force in spring 20, with the suspension at normal configuration is, approximately 1300 pounds due to the energy confined in such vehicle spring 20 by the static weight of the vehicle considering the leverage ratio of the suspension arms. As is the case with typical passenger vehicles, the unsprung weight is shown to have an upward travel of 2 inches, at the point where the spring intersects the lower suspension arm, and a downward travel of 3 inches as illustrated on the graph. When the unsprung weight is at the upper limit of travel, as determined by the rubber bumper cushioning means at such limit, the greatest compression will be present in vehicle spring 20, the magnitude of which is shown, on the graph, to be 1700 pounds. When the unsprung weight is at the lower limit of its travel, as determined by the rubber bumper cushioning means provided at the lower limit of suspension travel, the force remaining in vehicle spring 20 is shown, on the graph, to be 700 pounds on the graph.

Referring next to line B of graph 6, such line represents effect of preloaded pressure limiting means 98, the effect of which is previously described herein. Whereas line A shows the rate of spring 20 to be 200 pounds per linear inch of displacement, line B shows the rate of preloaded pressure limiting means 98 to be zero; that is, within the range of displacement in which pressure limiting means 98 produces an effect on the suspension, the effect of such means is substantially a constant 500 pounds. This is, due to the use of a pneumatic force applying means in pressure limiting means 98, provided by pneumatic cylinder 107 previously described. It will be understood that if pressure limiting means 98 were provided with a suitable preloaded coil spring for urging piston 106 towards the closed position illustrated in Figure 2, the force picture illustrated by line B would no longer be constant and such line would depict a selected spring rate in the manner of line A.

Referring again to line B of Figure 6, it will be seen at 201 that pressure limiting means 98 becomes effective on the system at the normal configuration datum line 170 and produces its entire 500 pound effect susbtantially at normal configuration since actuation of the apparatus, by closing of the valve means 62, is effected when the suspension is in normal configuration as previously described. The full effect of pressure limiting means 98, however, it actually applied somewhat gradually, as shown by the line portion 203, until the full effect of 500 pounds is present on the system at 204. It will be noted that as the effect of such limiting means 98, as shown by line B, progresses from zero pounds to 500 pounds the unsprung weight will have departed downwardly, from normal configuration datum 170, a distance of approximately one quarter inch of suspension travel. The reason for the effect of pressure limiting means 98 being applied somewhat gradually, over such small distance of downward suspension travel, is due to the presence and yieldability of conventional rubber cushions such as are illustrated at 38 in the proceeding figures. Line portion 203 varies also, during a short time duration return stroke, due to function of cushion 136 in Figure 2.

Referring next to line A plus B on graph 6, such line shows the combined effect, between sprung and unsprung weight, of vehicle spring 20 and pressure limiting means 98. Since pressure limiting means 98 only becomes effective below the normal configuration datum line, line A plus B can be thought of as being coincident with line A above such datum. Below the datum line 170, however, the modifying effect of the pressure limiting means 98, on vehicle spring 20, is clearly illustrated by the graph. The line portion 208 shows that pressure limiting means 98 commences contributing to the combined effect at point 210 with increasing magnitude upward until its full effect of 500 pounds becomes effective at point 211. Between point 211 and point 212 the entire modifying effect of pressure limiting means 98 is present. Hence it is seen that pressure limiting means commences to have its confining effect, on vehicle spring 20, at normal configuration, and, as the unsprung weight departs downwardly from normal datum 170, the effect of pressure limiting means 98 rapidly increases and reaches its full effect of 500 pounds after approximately one quarter inch of downward suspension travel. As stated before, this gradual application of effect is due to the presence of the rubber cushions 38 provided at the end connections of the confining cylinder 25 and piston rod 33.

The previously described preloaded predetermined confining force, of a magnitude necessary to accomplish the purpose of the present invention, will be constantly imposed on the vehicle spring for all positions of suspension configuration below the points 204 and 211 appearing on graph of Figure 6. This predetermined confining force is quantatively represented by the horizontally extending arrow 214 which graphically represents the magnitude of the maximum preloaded confining force, above which yielding of the suspension system occurs. Such maximum confining force is of course equal to the 500 pound effect of pressure limiting means 98 as illustrated by line B on the graph.

At this point it should be pointed out due to the flat rate of the pneumatic type pressure limiting means 98, the downward yielding of the unsprung weight, against the yieldable confining action of the pressure limiting means, is such as to provide very desirable riding characteristics when uneven road surfaces are encountered in curves, with the maximum value for such confining force being predetermined to be of sufficient magnitude to prevent unloading of the stored spring energy under the most severe cornering characteristics for the particular vehicle for which is has been determined.

Figure 7:
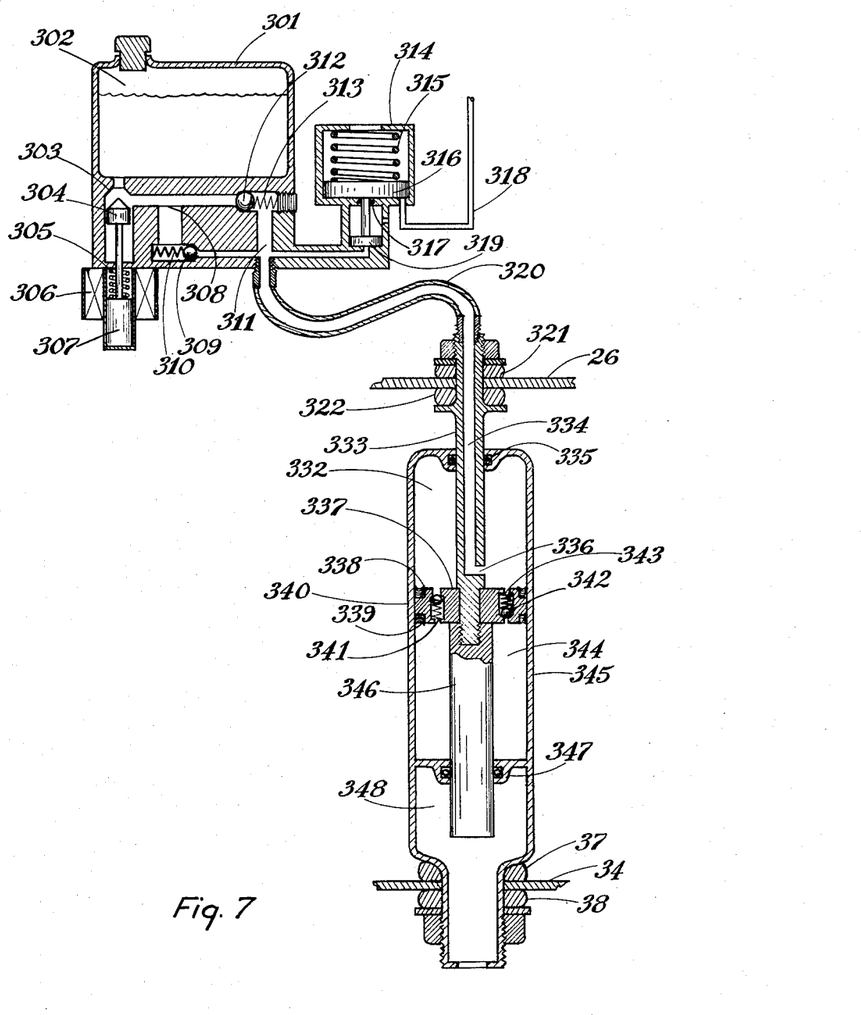
Figure 7 is a diagrammatic view illustrating an apparatus which constitutes a second aspect of the present invention.

Reference is next made to Figure 7 which schematically illustrates an apparatus constituting a separate aspect of the present invention. With such aspect only a single line 320 is required between a combined reservoir and control unit, indicated generally at 301, and a confining means 345 which is connected between sprung weight 26 and unsprung weight 34 of a motor vehicle.

Resilient cushions 321, 322, 37 and 38 are provided at the connections for the confining means between sprung and unsprung weight. A rod portion 333 is connected to a second rod portion 346. The diameter of portion 346 is greater than the diameter of portion 333, with a piston 337 separating the confining means 345 into an upper chamber 332 and a lower chamber 344. Piston seals 338 and 339 and rod seals 335 and 347 serve to substantially eliminate any leakage from and between the chambers 332 and 344.

In operation of the aspect of Figure 7, solenoid 306 is actuated by suitable switch means, not illustrated, when the vehicle enters a curve and valve member 307 is urged upwardly whereby tapered portion 304 seats at 303. Closure of seat 303 isolates line 320 and hence chamber 332 from reservoir 302. Hence piston 337 cannot move upwardly in its cylinder due to the fact that more rod volume is being added to chamber 344 than the volume of rod being subtracted from chamber 332. Such prevention of upward movement occurs because rod 346 is of greater diameter than rod 333 whereby chamber 332 cannot receive fluid at the flow rate at which chamber 344 must expel it if upward movement of piston 337 is to occur.

As soon as value portion 304 becomes unseated after the curve is negotiated, chamber 332 can expel fluid to reservoir 302 and the piston 337 is free to move upwardly in its cylinder.

Pressure limiting means 314 includes a piston 319 exposed to the fluid system and is provided with a preloaded force applying means as previously described.

With valve portion 304 seated, piston 319 will yield upwardly responsive to road imposed impacts which produce a pressure greater than the predetermined value required to compensate for the centrifugal force encountered in a curve, all in the manner previously described herein.

Fluid actuated check valves 309 and 312 are normally closed whereby shock absorber action is provided when piston 337 moves upwardly. To effect such shock absorber action, on the upstroke of piston 337, check valve 309 is biased closed by a spring 310 provided with an appropriate preload to effect the desired shock absorber action.

When piston 337 moves downwardly, valve 312, being provided with a light spring 313, readily opens to provide rapid ingress of fluid to maintain the confining means 345 full so that cavitation is avoided and shock absorber action is maintained at all times.

A fluid actuated check valve 342, including preloaded spring 343, may be included to provide shock absorber action on the downstroke of piston 337. Check valve 340 provides a passage for fluid from chamber 332 to chamber 344 on the upstroke of piston 337, with such valve 342 being maintained closed on the downstroke of the piston in order to obtain shock absorber action at check valve 342.

In view of the above it will be understood that the apparatus of Figure 7 can be operated either as a combined shock absorber and confining means for the vehicle spring, or as a confining means alone, depending on whether or not the above described fluid actuated check valves are incorporated in the system.

While the forms of embodiments of the present invention as herein disclosed constitute preferred forms, it is to be understood that other forms might be adopted, all coming within the scope of the claims which follow.

I claim:

1. In an apparatus for improving the cornering characteristics of a vehicle negotiating a curve by varying the effect of spring energies stored between the sprung and unsprung weights of that type of vehicle employing springs on opposite sides thereof connected between the sprung and unsprung weights; a hydraulic confining means for one of the springs connected between the sprung and unsprung weights at one side of the vehicle; a hydraulic confining means for the other spring connected between the sprung and unsprung weights on the other side of vehicle, each of said hydraulic confining means including a cylinder connected with one of the weights and a cooperating piston connected with the other of said weights; means forming fluid paths having portions connected with the cylinders; valve means for controlling the flow of fluid in said paths, said valve means having a neutral position in which the pressure in the paths is at a static level, said valve means having a "right" position and a "left" position on opposite sides of said neutral position, said valve means when in the "right" position causing entrapment of hydraulic fluid in one of said cylinders only, said valve means when in the "left" position causing entrapment of hydraulic fluid in the other of said cylinders only; means for shifting said valve means; fluid reservoir means communicating with said hydraulic confining means; and anti-cavitation means located in the fluid flow between said fluid reservoir means and said hydraulic confining means for providing a resistance to said fluid flow from said confining means to said reservoir means, said resistance being ineffective on fluid flow from said reservoir means to said confining means.

2. In an apparatus for improving the cornering characteristics of a vehicle negotiating a curve by varying the effect of spring energies stored between the sprung and unsprung weights of that type of vehicle employing springs on opposite sides thereof connected between the sprung and unsprung weights; a hydraulic confining means for one of the springs connected between the sprung and unsprung weights at one side of the vehicle; a hydraulic confining means for the other spring connected between the sprung and unsprung weights on the other side of vehicle, each of said hydraulic confining means including a cylinder connected with one of the weights and a cooperating piston connected with the other of said weights; means forming a path having one end connected with one of the cylinders on one side of the piston therein and the other end connected with said one cylinder on the other side of the piston therein; means forming a path having one end connected with the other cylinder on one side of the piston therein and the other end connected with said other cylinder on the other side of the piston therein; means forming fluid paths having portions connected with the cylinders; valve means for controlling the flow of fluid in said paths, said valve means having a neutral position in which the pressure in the paths is at a static level, said valve means having a "right" position and a "left" position on opposite sides of said neutral position, said valve means when in the "right" position causing entrapment of hydraulic fluid in one of said cylinders only, said valve means when in the "left" position causing entrapment of hydraulic fluid in the other of said cylinders only; means for shifting said valve means and a fluid pressure limiting means responsive to pressure of said entrapment hydraulic fluid in said cylinders, said fluid pressure limiting means including a fluid intake chamber, an element moveable in said chamber under pressure of said entrapped hydraulic fluid in one direction, and yieldable means applying a preloaded force to said element in the opposite direction; fluid reservoir means communicating with said hydraulic confining means; and anti-cavitation means including a fluid actuated valve preloaded to resist passage of fluid into said reservoir means.

3. Mechanism as defined in claim 1, characterized to include pressure limiting means responsive to pressure in the path between the entrapped fluid in a cylinder and said valve means.

4. Mechanism as defined in claim 1, characterized to include pressure limiting means responsive to pressure in the path between the entrapped fluid in a cylinder and said valve, said fluid pressure limiting means including a fluid intake chamber, an element moveable in said chamber under pressure of said entrapped hydraulic fluid in one direction, and yieldable means applying a preloaded force to said element in the opposite direction.

5. In an apparatus for improving the cornering characteristics of a vehicle negotiating a curve by decreasing the effect of spring energy stored between the sprung and unsprung weight of the vehicle, the combination of spring means connected between the sprung and unsprung weight of the vehicle; hydraulic confining means connected between the sprung and unsprung weight at one side of said vehicle whereby unloading of stored spring energy exhausts fluid from said confining means; a fluid reservoir carried by said vehicle; a fluid conduit connecting said confining means with said reservoir; valve means for selectively preventing the passage of fluid from said confining means; and a fluid pressure limiting means responsive to fluid pressure between said confining means and said valve means, said fluid pressure limiting means including a fluid intake chamber, an element moveable in one direction in said chamber under pressure of said fluid, means constantly yieldingly urging said element in the opposite direction; and means for cushioning the return of said element to the position from which it was initially moved by said fluid pressure.

6. In an apparatus for improving the cornering characteristics of a vehicle negotiating a curve by decreasing the effect of spring energy stored between the sprung and unsprung weights of the vehicle, the combination of spring means connected between the sprung and unsprung weights of the vehicle; hydraulic confining means connected between the sprung and unsprung weights at one side of said vehicle whereby unloading of stored spring energy exhausts fluid from said confining means; a fluid reservoir carried by said vehicle; a fluid conduit connecting said confining means with said reservoir; valve means for selectively preventing the passage of fluid from said confining means; and a fluid pressure limiting means responsive to fluid pressure between said confining means and said valve means, said fluid pressure limiting means including a fluid intake chamber, an element moveable in said chamber under pressure of said fluid in one direction, and yieldable means applying a preloaded force of substantially constant value to said element in the opposite direction.

7. In an apparatus for improving the cornering characteristics of a vehicle negotiating a curve by decreasing the effect of spring energy stored between the sprung and unsprung weight of the vehicle, the combination of spring means connected between the sprung weight and the unsprung weight of said vehicle; a hydraulic cylinder and piston unit operatively connected between the sprung and unsprung weight and located in a fluid system, said piston forming a moveable fluid seal between two chambers in said cylinder; a fluid pressure limiting means communicating with a high pressure portion of said fluid systems; a fluid reservoir carried by said vehicle and communicating with a low pressure portion of said fluid system; a first fluid conduit connecting one of said chambers with said low pressure portion of said system; a second fluid conduit connecting the other of said chambers with said high pressure portion of said system; valve means for selectively preventing the passage of fluid from one of said chambers to said low pressure portion of said system while said one chamber is maintained in communication with said high pressure portion of said system; and anti-cavitation means located in the fluid flow between said first conduit and said reservoir for providing a resistance to passage of fluid into said reservoir.

8. In an apparatus for improving the cornering characteristics of a vehicle negotiating a curve by decreasing the effect of spring energy stored between the sprung and unsprung weight of the vehicle, the combination of spring means connected between the sprung weight and the unsprung weight of said vehicle; a hydraulic cylinder and piston unit operatively connected between the sprung and unsprung weight and located in a fluid system, said piston forming a moveable fluid seal between two chambers in said cylinder a fluid pressure limiting means communicating with a high pressure portion of said fluid system; a fluid reservoir carried by said vehicle and communicating with a low pressure portion of said fluid system; a first fluid conduit connecting one of said chambers with said low pressure portion of said system; a second fluid conduit connecting the other of said chambers with said high pressure portion of said system; valve means for selectively preventing the passage of fluid from one of said chambers to said low pressure portion of said system while said one chamber is maintained in communication with said high pressure portion of said system; and anti-cavitation means located in the fluid flow between said first conduit and said reservoir, said anti-cavitation means including a fluid actuated valve preloaded to resist passage of fluid into said reservoir.

9. In an apparatus for improving the cornering characteristics of a vehicle negotiating a curve by decreasing the effect of spring energy stored between the sprung and unsprung weights of the vehicle, the combination of spring means connected between the sprung weight and the unsprung weights of said vehicle; a hydraulic cylinder and piston unit operatively connected between the sprung and unsprung weights and located in a fluid system, said piston forming a moveable fluid seal between two chambers in said cylinder; a fluid pressure limiting means communicating with a high pressure portion of said fluid system; a fluid reservoir carried by said vehicle and communicating with a low pressure portion of said fluid system; a first fluid conduit connecting one of said chambers with said low pressure portion of said system; a second fluid conduit connecting the other of said chambers with said high pressure portion of said system; valve means for selectively preventing the passage of fluid from one of said chambers to said low pressure portion of said system while said one chamber is maintained in communication with said high pressure portion of said system; and anti-cavitation means located in the fluid flow between said first conduit and said reservoir, said anti-cavitation means including a fluid actuated valve preloaded to resist passage of fluid into said reservoir and a fluid actuated valve permitting free passage of fluid out of said reservoir.

10. In an apparatus for improving the cornering characteristics of a vehicle negotiating a curve by decreasing the effect of spring energy stored between the sprung and unsprung weight of the vehicle, the combination of spring means connected between the sprung weight and the unsprung weight of said vehicle; a hydraulic cylinder and piston unit operatively connected between the sprung and unsprung weight and located in a fluid system, said piston forming a moveable fluid seal between two chambers in said cylinder; a fluid pressure limiting means communicating with a high pressure portion of said fluid system; a fluid reservoir carried by said vehicle and communicating with a low pressure portion of said fluid system; a first fluid conduit connecting one of said chambers with said low pressure portion of said system; a second fluid conduit connecting the other of said chambers with said high pressure portion of said system; valve means for selectively preventing the passage of fluid from one of said chambers to said low pressure portion of said system while said one chamber is maintained in communication with said high pressure portion of said system; anti-cavitation means located in the fluid flow between said first conduit and said reservoir for providing a resistance to passage of fluid into said reservoir; and fluid flow resisting means located in the flow of fluid from one of said chambers.

11. In an apparatus for improving the cornering characteristics of a vehicle negotiating a curve by decreasing the effect of spring energy stored between the sprung and unsprung weight of the vehicle, the combination of spring means connected between the sprung weight and the unsprung weight of said vehicle; a hydraulic cylinder and piston unit operatively connected between the sprung and unsprung weight and located in a fluid system, said piston forming a moveable fluid seal between two chambers in said cylinder; a fluid pressure limiting means communicating with a high pressure portion of said fluid system; a fluid reservoir carried by said vehicle and communicating with a low pressure portion of said fluid system; a first fluid conduit connecting one of said chambers with said low pressure portion of said system; a second fluid conduit connecting the other of said chambers with said high pressure portion of said system; valve means for selectively preventing the passage of fluid from one of said chambers to said low pressure portion of said system while said one chamber is maintained in communication with said high pressure portion of said system; anti-cavitation means located in the fluid flow between said first conduit and said reservoir for providing a resistance to passage of fluid into said reservoir; and fluid flow resisting means for one of said chambers, said flow resisting means presenting resistance to fluid flow from said one chamber and free passage to fluid flow towards said one chamber.

12. In an apparatus for improving the cornering characteristics of a vehicle negotiating a curve by decreasing the effect of spring energy stored between the sprung and unsprung weight of the vehicle, the combination of spring means connected between the sprung weight and the unsprung weight of said vehicle; a hydraulic cylinder and piston unit operatively connected between the sprung and unsprung weight and located in a fluid system, said piston forming a moveable fluid seal between two chambers in said cylinder; a fluid reservoir carried by said vehicle; a first fluid conduit connecting one of said chambers with said reservoir; a second fluid conduit connecting the other of said chambers with said fluid system; valve means for selectively preventing the passage of fluid from one of said chambers; fluid pressure limiting means communicating with the flow of fluid between said one chamber and said valve means; and anti-cavitation means located in the fluid flow between said first conduit and said reservoir for providing a resistance to passage of fluid into said reservoir.

13. In an apparatus for improving the cornering characteristics of a vehicle negotiating a curve by decreasing the effect of spring energy stored between the sprung and unsprung weight of the vehicle, the combination of spring means connected between the sprung weight and the unsprung weight of said vehicle; a hydraulic cylinder and piston unit operatively connected between the sprung and unsprung weight and located in a fluid system, said piston forming a moveable fluid seal between two chambers in said cylinder; a fluid reservoir carried by said vehicle; a first fluid conduit connecting one of said chambers with said reservoir; a second fluid conduit connecting the other of said chambers with said fluid system; valve means for selectively preventing the passage of fluid from one of said chambers; fluid pressure limiting means communicating with the flow of fluid between said one chamber and said valve means; anti-cavitation means located in the fluid flow between said first conduit and said reservoir for providing a resistance to passage of fluid into said reservoir; and fluid flow resisting means located in the flow of fluid from one of said chambers.

14. In an apparatus for improving the cornering characteristics of a vehicle negotiating a curve by decreasing the effect of spring energy stored between the sprung and unsprung weight of the vehicle, the combination of spring means connected between the sprung and unsprung weight of the vehicle; hydraulic confining means connected between the sprung and unsprung weight at one side of said vehicle whereby unloading of stored spring energy exhausts fluid from said confining means; and valve means for selectively preventing the passage of fluid from said confining means, said valve means including a moveable element engageable with a seat element whereby fluid pressure from said confining means urges said moveable element against said seat element, means for moving said moveable element into seated engagement with said seat element and means for moving said moveable element away from seated engagement with said seat element.

15. In an apparatus for improving the cornering characteristics of a vehicle negotiating a curve by decreasing the effect of spring energy stored between the sprung and unsprung weight of the vehicle, the combination of spring means connected between the sprung and unsprung weight of the vehicle; hydraulic confining means connected between the sprung and unsprung weight at one side of said vehicle whereby unloading of stored spring energy exhausts fluid from said confining means; valve means for selectively preventing the passage of fluid from said confining means, said valve means including a moveable element engageable with a seat element whereby fluid pressure from said confining means urges said moveable element against said seat element, means for moving said moveable element into seated engagement with said seat element, and means for moving said moveable element away from seated engagement with said seat element; and fluid pressure limiting means responsive to the fluid pressure between said valve means and said confining means.

16. In an apparatus for improving the cornering characteristics of a vehicle negotiating a curve by decreasing the effect of spring energy stored between the sprung and unsprung weight of the vehicle, the combination of spring means connected between the sprung and unsprung weight of the vehicle; hydraulic confining means connected between the sprung and unsprung weight at one side of said vehicle whereby unloading of stored spring energy exhausts fluid from said confining means; valve means for selectively preventing the passage of fluid from said confining means, said valve means including a moveable element engageable with a seat element whereby fluid pressure from said confining means urges said moveable element against said seat element, means for moving said moveable element into seated engagement with said seat element, and means for moving said moveable element away from seated engagement with said seat element; and fluid flow resisting means located in the flow of fluid from said confining means.

17. In an apparatus for improving the cornering characteristics of a vehicle negotiating a curve by decreasing the effect of spring energy stored between the sprung and unsprung weights of the vehicle, the combination of spring means connected between the sprung weight and the unsprung weight of said vehicle; a hydraulic cylinder and piston unit operatively connected between the sprung and unsprung weights and located in a fluid system, said piston forming a moveable fluid seal between two chambers in said cylinder; a fluid reservoir carried by said vehicle; a first fluid conduit connecting one of said chambers with said reservoir; a second fluid conduit connecting the other of said chambers with said fluid system; anti-cavitation means located in the fluid flow between said first conduit and said reservoir for providing a resistance to passage of fluid into said reservoir; and valve means along one of said conduits for selectively preventing the passage of fluid from one of said chambers, said valve means including a moveable element engageable with a seat element whereby fluid pressure from said one chamber urges said moveable element against said seat element and fluid flow from said other chamber urges said moveable element away from said seat, means for moving said moveable element into seated engagement with said seat element, and means for moving said moveable element away from seated engagement with said seat element.

18. In an apparatus for improving the cornering characteristics of a vehicle negotiating a curve by decreasing the effect of spring energy stored between the sprung and unsprung weights of the vehicle, the combination of spring means connected between the sprung weight and the unsprung weight of said vehicle; a hydraulic cylinder and piston unit operatively connected between the sprung and unsprung weights and located in a fluid system, said piston forming a moveable fluid seal between two chambers in said cylinder; a fluid reservoir carried by said vehicle; a first fluid conduit connecting one of said chambers with said reservoir; a second fluid conduit connecting the other of said chambers with said fluid system; anti-cavitation means located in the fluid flow between said first conduit and said reservoir for providing a resistance to passage of fluid into said reservoir; valve means along one of said conduits for selectively preventing the passage of fluid from one of said chambers, said valve means including a moveable element engageable with a seat element whereby fluid pressure from said one chamber urges said moveable element against said seat element and fluid flow from said other chamber urges said moveable element away from said seat, means for moving said moveable element into seated engagement with said seat element, and means for moving said moveable element away from seated engagement with said seat element; and fluid pressure limiting means responsive to fluid pressure between said valve means and said one chamber.

19. In an apparatus for improving the cornering characteristics of a vehicle negotiating a curve by decreasing the effect of spring energy stored between the sprung and unsprung weights of the vehicle, the combination of spring means connected between the sprung weight and the unsprung weight of said vehicle; a hydraulic cylinder and piston unit operatively connected between the sprung and unsprung weights and located in a fluid system, said piston forming a moveable fluid seal between two chambers in said cylinder; a fluid reservoir carried by said vehicle; a first fluid conduit connecting one of said chambers with said reservoir; a second fluid conduit connecting the other of said chambers with said fluid system; anti-cavitation means located in the fluid flow between said first conduit and said reservoir for providing a resistance to passage of fluid into said reservoir; valve means along one of said conduits for selectively preventing the passage of fluid from one of said chambers, said valve means including a moveable element engageable with a seat element whereby fluid pressure from said one chamber urges said moveable element against said seat element and fluid flow from said other chamber urges said moveable element away from said seat, means for moving said moveable element into seated engagement with said seat element, and means for moving said moveable element away from seated engagement with said seat element; and fluid flow resisting means located in the flow of fluid from said one chamber.

20. In an apparatus for improving the cornering characteristics of a vehicle negotiating a curve by decreasing the effect of spring energy stored between the sprung and unsprung weight of the vehicle, the combination of spring means connected between the sprung and unsprung weight of the vehicle; and hydraulic means connected between the sprung and unsprung weights of the vehicle, said hydraulic means including a moveable wall separating two chambers and having a fluid passage formed therethrough; fluid conduit means connecting one of said chambers to a supply of fluid; and means for increasing the internal volume of one of said chambers and for decreasing the internal volume of the other of said chambers responsive to relative movement between said sprung and unsprung weight, said volumetric increase being effected at a lower rate than said volumetric decrease whereby the total volumetric capacity of said two chambers is decreased and fluid is expelled through said fluid conduit means to said supply; valve means for selectively closing said fluid conduit means; and fluid pressure limiting means responsive to fluid pressure between one of said chambers and said valve means.

21. In an apparatus for improving the cornering characteristics of a vehicle negotiating a curve by decreasing the effect of spring energy stored between the sprung and unsprung weight of the vehicle, the combination of spring means connected between the sprung and unsprung weights of the vehicle; hydraulic means connected between the sprung and unsprung weights of the vehicle, said hydraulic means including a cylinder member connected to one of said weights, a rod member connected to the other of said weights, piston means on said rod member dividing said cylinder into a first chamber and a second chamber; means forming a fluid conduit for passage of fluid into and out of one of said chambers;

a first rod portion on said rod member extended through one of said chambers and a second rod portion on said rod member extended through the other of said chambers, one of said rod portions having a greater diameter than the other of said rod portions whereby extension of said rod portion of greater diameter into its respective chamber and withdrawal of said rod portion of lesser diameter from its respective chamber expels fluid from said one chamber and through said fluid conduit; means forming a fluid conduit between said chambers; and valve means for selectively closing said first mentioned fluid conduit.

22. Apparatus defined in claim 20 characterized by fluid flow resisting means being interposed in the flow of fluid between said chambers.

23. Apparatus defined in claim 20 characterized by fluid pressure limiting means responsive to fluid pressure between one of said chambers and said valve means.

24. In an apparatus for improving the cornering characteristics of a vehicle negotiating a curve by decreasing the effect of spring energy stored between the sprung and unsprung weight of the vehicle, the combination of spring means connected between the sprung and unsprung weight of the vehicle; and hydraulic means connected between the sprung and unsprung weights of the vehicle, said hydraulic means including a moveable wall separating two chambers and having a fluid passage formed therethrough; fluid conduit means connecting one of said chambers to a supply of fluid; and means for increasing the internal volume of one of said chambers and for decreasing the internal volume of the other of said chambers responsive to relative movement between said sprung and unsprung weight, said volumetric increase being effected at a lower rate than said volumetric decrease; valve means for selectively closing said fluid conduit means; fluid reservoir means connected to one of said chambers; means forming a fluid actuated gate between said chamber and said reservoir, said gate providing resistance to passage of fluid from said one chamber to said reservoir said valve means including actuating means for closing same against fluid passage in one direction, said valve means being openable responsive to fluid pressure in the other direction.

25. In an apparatus for improving the cornering characteristics of a vehicle negotiating a curve by decreasing the effect of spring energy stored between the sprung and unsprung weight of the vehicle, the combination of spring means connected between the sprung and unsprung weight of the vehicle; and hydraulic means connected between the sprung and unsprung weights of the vehicle, said hydraulic means including a moveable wall separating two chambers and having a fluid passage formed therethrough; fluid conduit means connecting one of said chambers to a supply of fluid; and means for increasing the internal volume of one of said chambers and for decreasing the internal volume of the other of said chambers responsive to relative movement between said sprung and unsprung weight, said volumetric increase being effected at a lower rate than said volumetric decrease; valve means for selectively closing said fluid conduit means; fluid reservoir means connected to one of said chambers; means forming a fluid actuated gate between said chamber and said reservoir, said gate providing resistance to passage of flluid from said one chamber to said reservoir, said valve means including actuating means for closing same against fluid passage in one direction, said valve means being openable responsive to fluid pressure in the other direction; and fluid pressure limiting means responsive to fluid pressure between one of said chambers and said valve means.

References Cited in the file of this patent

UNITED STATES PATENTS

| | | |
|---|---|---|
| 1,975,642 | Landeweer | Oct. 2, 1934 |
| 2,812,954 | Lyon | Nov. 12, 1957 |

FOREIGN PATENTS

| | | |
|---|---|---|
| 125,863 | Australia | July 3, 1947 |
| 610,065 | France | May 29, 1926 |
| 518,848 | Great Britain | Mar. 8, 1940 |